(12) United States Patent
Hertzog (10) Patent No.: US 11,357,155 B2
(45) Date of Patent: Jun. 14, 2022

(54) AGRICULTURAL IMPLEMENT

(71) Applicant: CNH Industrial America LLC, New Holland, PA (US)

(72) Inventor: Daniel Hertzog, Blackstad (SE)

(73) Assignee: CNH Industrial America LLC, New Holland, PA (US)

( * ) Notice: Subject to any disclaimer, the term of this patent is extended or adjusted under 35 U.S.C. 154(b) by 60 days.

(21) Appl. No.: 16/865,347

(22) Filed: May 2, 2020

(65) Prior Publication Data

US 2020/0359544 A1    Nov. 19, 2020

(30) Foreign Application Priority Data

May 16, 2019   (EP) ..................................... 19174864

(51) Int. Cl.
| | |
|---|---|
| *A01B 63/22* | (2006.01) |
| *A01B 3/46* | (2006.01) |
| *A01B 15/14* | (2006.01) |
| *A01B 3/42* | (2006.01) |

(52) U.S. Cl.
CPC ............... *A01B 63/22* (2013.01); *A01B 3/42* (2013.01); *A01B 3/464* (2013.01); *A01B 15/145* (2013.01)

(58) Field of Classification Search
CPC ........... A01B 63/22; A01B 3/42; A01B 3/464; A01B 15/145
See application file for complete search history.

(56) References Cited

U.S. PATENT DOCUMENTS

| | | |
|---|---|---|
| 2,760,420 A | 8/1956 | Pursche |
| 3,087,556 A | 4/1963 | Pursche |

FOREIGN PATENT DOCUMENTS

| | | |
|---|---|---|
| DE | 202009014618 U1 | 3/2011 |
| EP | 0171861 A1 | 2/1986 |

OTHER PUBLICATIONS

Extended European Search Report for EP Application No. 19174864.9 dated Dec. 3, 2019 (six pages).

*Primary Examiner* — Tara Mayo-Pinnock
(74) *Attorney, Agent, or Firm* — Rebecca L. Henkel; Rickard K. DeMille (57) ABSTRACT

The present invention relates to an agricultural implement comprising a main frame supporting a plurality of ground engaging tools, the main frame being transferable between a first configuration, in which a first plurality of ground engaging tools are in a working position, and a second configuration, in which a second plurality of ground engaging tools are in a working position. A first depth wheel is connected to the main frame and capable of adjusting a working depth of the first plurality of ground engaging tools, when the main frame is in its first configuration. A second depth wheel connected to the main frame and capable of adjusting a working depth of the second plurality of ground engaging tools, when the main frame is in its second configuration. At least the first depth wheel is pivotable in such a way that the first depth wheel moves with respect to the second depth wheel.

15 Claims, 10 Drawing Sheets

AGRICULTURAL IMPLEMENT

BACKGROUND OF THE INVENTION

The present disclosure relates to an agricultural implement, particularly, but not exclusively, to an agricultural plough with an improved double depth wheel arrangement. Another aspect relates to agricultural machinery comprising the agricultural implement connected to a tractor.

In agriculture, farming cycles are followed that can roughly be divided into the different steps of land preparation, seed sowing, fertilizing, irrigation, crop growth, and harvesting. Each of these steps is critical to yield optimal crop results and achieve the desired returns on initial investments. Of the listed steps, land preparation is typically further divided into steps of, as necessary, clearing obstructions (e.g. bushes, stones and rocks) and subsequent tillage.

Tilling crumbles and loosens the soil, improves the soil structure and incorporates crop residues and manure into the soil, thus fertilizing the ground. The improved soil structure allows for increased plant root growth, soil aeration and water penetration/filtration. Overall this results in higher yields, better long-term soil fertility, soil moisture retention, and weed management. Tillage can be separated into primary (relatively deep) and secondary (relatively shallow) tillage. In primary tillage, such as ploughing, the soil is turned over such that nutrients come to the surface. In addition to turning up the soil to bring fresh nutrients to the top and depositing plant residue below where it will break down, this process also aerates the earth—enabling it to hold more moisture. Preparing the land to a greater depth produces a rougher surface finish than secondary tillage. Secondary tillage (e.g. seedbed cultivation) breaks up soil clods into smaller masses which might be desirable for small seeds or plants that have minimal clod-handling ability.

Primary tillage, and particularly ploughing, is widely regarded as one of the most effective ways of preventing crop disease, removing weeds, and controlling mice and other pests. In its simplest form the turnplough, also known as the mouldboard plough, includes a variety of plough bodies, which are blades for penetrating and turning over the soil in arrays of adjacent trenches, known as furrows. Modern ploughs typically include a plurality of plough bodies connected to a plough frame such that they are laterally offset from each other when the plough is in use. Each plough body is connected to the plough frame via corresponding beams. The plough frame, in turn, is connected to a towing or pushing vehicle via a hitch arranged at a front or back end of the frame.

Depending on the density of the soil, a working depth of the plough bodies can be adjusted. For instance, the plough bodies working depth may be shallow in harder (dense) soils, whereas a deeper working depth may be applied in softer (less dense) soils. The plough bodies can be rigidly attached to the main frame, such that their distance from the main frame remains constant. Accordingly, the working depth of the ploughs are then adjusted by varying the ground clearance of the main frame. If the main frame is brought closer to the ground surface, the ground clearance is reduced, and the plough bodies penetrate deeper into the soil. Similarly, if the main frame is lifted further off the ground, the ground clearance is increased, and the plough raised, thereby reducing the working depth.

The ground clearance of the main frame may be controlled by one or more depth wheels. The one or more depth wheels may be connected to any part of the main frame such as the rear end of the main frame. An adjustable linkage may be provided between the main frame and the depth wheel to allow for changes in the distance between the depth wheel and the main frame. During ploughing, the depth wheel runs on the ground surface and supports the weight of the plough. If the distance between the depth wheel and the main frame is reduced, then the ground clearance between the main frame and the ground surface reduces accordingly. On the other hand, if the distance between the depth wheel and the main frame is increased, the ground clearance of the main frame increases. As outlined before, changing the main frame's ground clearance results in a variation of the plough body working depth.

Most modern ploughs are of the reversible type, in which the main frame is rotatable by 180 degrees (reversed) with respect to the headstock. A turning cylinder attached to the headstock may be used to rotate (reverse) the plough. During rotation of the main frame, a first set of plough bodies, which was initially arranged below the main frame (first configuration), is transferred to the top of the main frame. At the same time, a second set of plough bodies, which was initially arranged on top of the main frame, is then transferred to a position below the main frame. The reversible plough is then in its second configuration. The main frame may be repeatedly rotated between the first and second configuration, particularly during a turning manoeuvre on the headlands. Whenever the plough is reversed, the first and second set of plough bodies swap position.

In reversible ploughs, a means of adjusting the working depth of the plough bodies (i.e. the main frame) is required for both configurations of the reversible plough. There are mainly two types of depth control wheels for reversible ploughs. A first type includes a single pivoting depth wheel, which is used in both configurations of the reversible plough. The single pivoting depth wheel has to be moved from one side of the main frame to the other during reversal. This side transfer of the single depth wheel may be achieved by swinging the latter from one side to the other. The swinging movement needs to be controlled/dampened to avoid excessive impacts as the wheel swings down during reversal of the plough.

A second solution avoids the need for a movement of the depth adjustment wheel from one side to the other. In this second alternative, two separate depth wheels may be fixed to the main frame. A first depth wheel can be arranged on a first side of the main frame and a second depth wheel may be arranged on the second, opposite side of the main frame. Each of the two wheels is then only utilised in one configuration of the plough. This double wheel arrangement does not experience dynamic impacts, because the first and second depth wheels are fixed in place during the reversal procedure. However, it is a problem that this "double-/dual-wheel" solution places restrictions on the maximum diameter of the depth wheels, since larger diameters may cause the wheels to touch, particularly when the working depth of the plough bodies is set to deeper levels. Yet, it is generally desirable to utilise large diameter wheels to reduce rolling resistance and soil compaction. Moreover, the use of double wheels may require an independent adjustment mechanism for both wheels to allow for a synchronised ground clearance setting on both sides of the reversible plough.

In view of the aforementioned problem, there is a need to provide an agricultural implement with a double wheel arrangement that allows for the use of bigger wheel diameters and longer service life.

It is an aim of the present invention to solve or at least ameliorate one or more problems of the prior art.

SUMMARY OF THE INVENTION

Aspects and embodiments of the disclosure provide an agricultural implement and an agricultural machinery as claimed in the appended claims.

According to one aspect of the current disclosure, there is provided an agricultural implement comprising a main frame supporting a plurality of ground engaging tools, the main frame being transferable between a first configuration, in which a first plurality of ground engaging tools are in a working position, and a second configuration, in which a second plurality of ground engaging tools are in a working position. The agricultural implement comprises a first depth wheel connected to the main frame such that the position of the first depth wheel with respect to the main frame defines a working depth of the first plurality of ground engaging tools, when the main frame is in its first configuration and a second depth wheel connected to the main frame such that the position of the second depth wheel with respect to the main frame defines a working depth of the second plurality of ground engaging tools, when the main frame is in its second configuration. At least the first depth wheel is pivotable in such a way that the first depth wheel moves with respect to the second depth wheel.

The present invention relates to an agricultural implement with a double wheel arrangement. However, in contrast to existing double wheel arrangements, the two wheels of the present disclosure are not fixed with respect to each other. Rather, the first wheel may be pivoted with respect to the second depth wheel to adjust the distance between the two. At the same time, the pivoting movement of the first depth wheel will cause an adjustment of the ground clearance of the main frame. In particular, as the first wheel is pivoted towards the second depth wheel the ground clearance of the main frame is reduced, thereby increasing the working depth of the first plurality of ground engaging tools. If the first depth wheel is pivoted away from the second depth wheel, the ground clearance of the main frame is increased, thereby reducing the working depth of the ground engaging tools.

Adjusting the position of the double wheel arrangement via a pivoting movement of the first wheel with respect to the second wheel provides an opportunity to utilise larger diameter wheels. Moreover, as will be described in more detail below, arrangements described herein can reduce impact forces when moving the main frame between its first and second configuration (reversal) and generally reduces the number of actuators required.

The first and second depth wheels may both be pivotable about the main frame. Accordingly, the depth adjustment in both configurations of the main frame can be affected by pivotal movement of the first or second depth wheel. The first and second depth wheels may either pivot together and/or pivot independently.

The first and second depth wheels may be connected to the main frame via a common pivot. In other words, the second depth wheels may pivot about the same axis, thereby reducing the required space envelope. Of course, it may also be possible to provide separate pivots for the first and second depth wheel.

In another embodiment, the first depth wheel is connected to the common pivot via a first wheel arm and a second depth wheel is connected to the common pivot via a second wheel arm, the first and second wheel arms defining a wheel angle between each other, the wheel angle being adjustable. It will be appreciated that the wheel angle and the length of the first and second wheel arms together define a distance between the first and second depth wheel. A measurement of the wheel angle may, therefore, be used to determine the position of the first and second depth wheels with respect to each other and/or with respect to the main frame.

The agricultural implement may comprise an actuator, which is capable of adjusting the wheel angle. The layout of the two depth wheels allows for a depth adjustment with a single actuator, in both positions of the main frame. This actuator may be a hydraulic actuator arranged between the first and second wheel arms. Alternatively, any other actuator, such as a pneumatic or an electric actuator, or even a manual adjustment mechanism may be provided to alter the wheel angle.

The first and second wheel arms may be pivotable with respect to the main frame such that the working depth of the first plurality of the ground engaging tools, in the first configuration of the main frame, is adjustable by changing the wheel angle. The first and second wheel arms may be pivotable with respect to the main frame such that the working depth of the second plurality of ground engaging tools, in the second configuration of the main frame, is adjustable by changing the wheel angle. Particularly if one of the first and second depth wheels is fixed in place, then an adjustment of the wheel angle will result in a movement of the respective other depth wheel with respect to the main frame. Such pivotal movement of the non-fixed depth wheel with respect to the main frame causes and adjustment of the main frame's ground clearance and, therefore, changes the working depth of the ground engaging tools.

In another embodiment, the first wheel arm is configured such that a distance between a central axis of the first depth wheel and the common pivot is adjustable, and wherein the second wheel arm is configured such that the distance between a central axis of the depth wheel and the common pivot is adjustable. To this end, the first and second wheel arms may either be telescopic or the position of the wheels along the length of their respective wheel arm may be adjustable. Changing the distance between the common pivot and the first and second depth wheels provides a further opportunity to increase the maximum wheel diameter that can be used with the agricultural implement of the present disclosure. Larger diameter depth wheels result in lower rolling resistance and less soil compaction. Accordingly, it is desirable to utilise a larger depth wheels on agricultural implements.

According to another embodiment, in the first configuration of the main frame, the first depth wheel is pivotable between a first position, in which a minimum working depth of the first plurality of ground engaging tools is set, and a second position, in which a maximum working depth of the first plurality of ground engaging tools is set, and wherein, in the second configuration of the main frame, the first depth wheel is in a third position. As will be described in more detail below, in some embodiments, the first position and the third position may be identical.

The agricultural implement may comprise a first end stop that defines the third position of the first depth wheel. The second position of the first depth wheel may be defined by a minimum wheel angle that still avoids contact between the first and second depth wheel.

In yet another embodiment, in the second configuration of the main frame, the second depth wheel is pivotable between a first position, in which a minimum working depth of the second plurality of ground engaging tools is set, and a second position, in which a maximum working depth of the second plurality of ground engaging tools is set, and wherein, in the first configuration of the main frame, the second depth wheel is in a third position. As will be described in more detail below, in some embodiments, the first position and the third position may be identical.

The agricultural implement may comprise a second end stop that defines the third position of the second depth wheel. The second position of the second depth wheel may be defined by a minimum wheel angle that still avoids contact between the first and second depth wheels.

In another embodiment, the agricultural implement comprises a first end stop arranged such that that the first depth wheel is biased towards its third position against the first end stop, when the main frame is in its second configuration, and wherein the agricultural implement comprises a second end stop arranged such that that the second depth wheel is biased towards its third position against the second end stop, when the main frame is in its first configuration. In other words, the first and second depth wheels may be connected in such a way that the weight carried by the first depth wheel, in the first configuration of the main frame, is transferred onto the second depth wheel such that the first and second depth wheels pivot together about the common pivot until the second depth wheel reaches its third position. The weight of the frame thus biases the second depth wheel into its third position. The inverse is the case, if the main frame is in its second configuration, in which the load on the second depth wheel (now engaging the ground surface) pushes the first depth wheel into its third position.

The agricultural implement may be a reversible plough. However, it is also feasible that the agricultural implement is any other agricultural device that would benefit from a dual wheel arrangement.

In another aspect of the present disclosure, there is provided an agricultural machinery comprising an agricultural vehicle, such as tractor, and any embodiment of the agricultural implement described above, wherein the agricultural implement is connected to the front or rear of the agricultural vehicle.

The agricultural vehicle or tractor may include one or more control devices, such as but not limited to programmable or non-programmable processors. Similarly, the agricultural implement may include one or more control devices, such as but not limited to programmable or non-programmable processors. Additionally, or alternatively, the agricultural implement may be controlled by one or more control devices of the agricultural vehicle. Similarly, the agricultural vehicle may be controlled by one or more control devices of the agricultural implement.

The agricultural vehicle and/or the agricultural implement may be remote controlled, e.g. from a farm office. Accordingly, the agricultural vehicle may include one or more communication interfaces for connection to a remote processor and/or a remote controller. Similarly, the agricultural implement may include one or more communication interfaces for connection to a remote processor and/or a remote controller.

According to another aspect of the present disclosure, there is provided a method for adjusting the working depth of an agricultural implement, wherein the agricultural implement comprises a first pivotable depth wheel and a second pivotable depth wheel, the method comprising the following steps:

immobilising the second depth wheel to prevent pivotal movement of the second depth wheel;

optionally bringing the first depth wheel into contact with a ground surface; and pivoting the first depth wheel with respect to the second depth wheel to adjust the working depth of the agricultural implement.

In yet another embodiment, pivoting the first depth wheel with respect to the second depth wheel comprises pivoting the first depth wheel towards the second depth wheel, if an increase in the working depth of the agricultural implement is required; and pivoting the first depth wheel away from the second depth wheel, if a decrease in the working depth of the agricultural implement is required.

According to another aspect of the present disclosure, there is provided a method for switching (reversing) the configuration of an agricultural implement, the agricultural implement comprising a main frame being transferable between a first configuration, in which a first plurality of ground engaging tools are in a working position, and a second configuration, in which a second plurality of ground engaging tools are in a working position, the agricultural implement further comprising a first pivotable depth wheel and a second pivotable depth wheel and first and second end stops, the method comprising:

biasing the first depth wheel against the first end stop to temporarily prevent pivoting movement of the first depth wheel;

biasing the second depth wheel against the first end stop to temporarily prevent pivoting movement of the second depth wheel; and transferring the main frame from its first to its second configuration or from its second to its first configuration.

In another embodiment, the method may further comprise a step for bringing the second depth wheel into contact with a ground surface after the main frame has been transferred from its first configuration to its second configuration. If the main frame is transferred from its second configuration to its first configuration, the method may comprise a step for bringing the first depth wheel into contact with the ground surface after the main frame has reached its first configuration.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present disclosure will now be described by way of example only, with reference to the accompanying drawings, in which.

DETAILED DESCRIPTION OF THE DRAWINGS

Figure 1A:
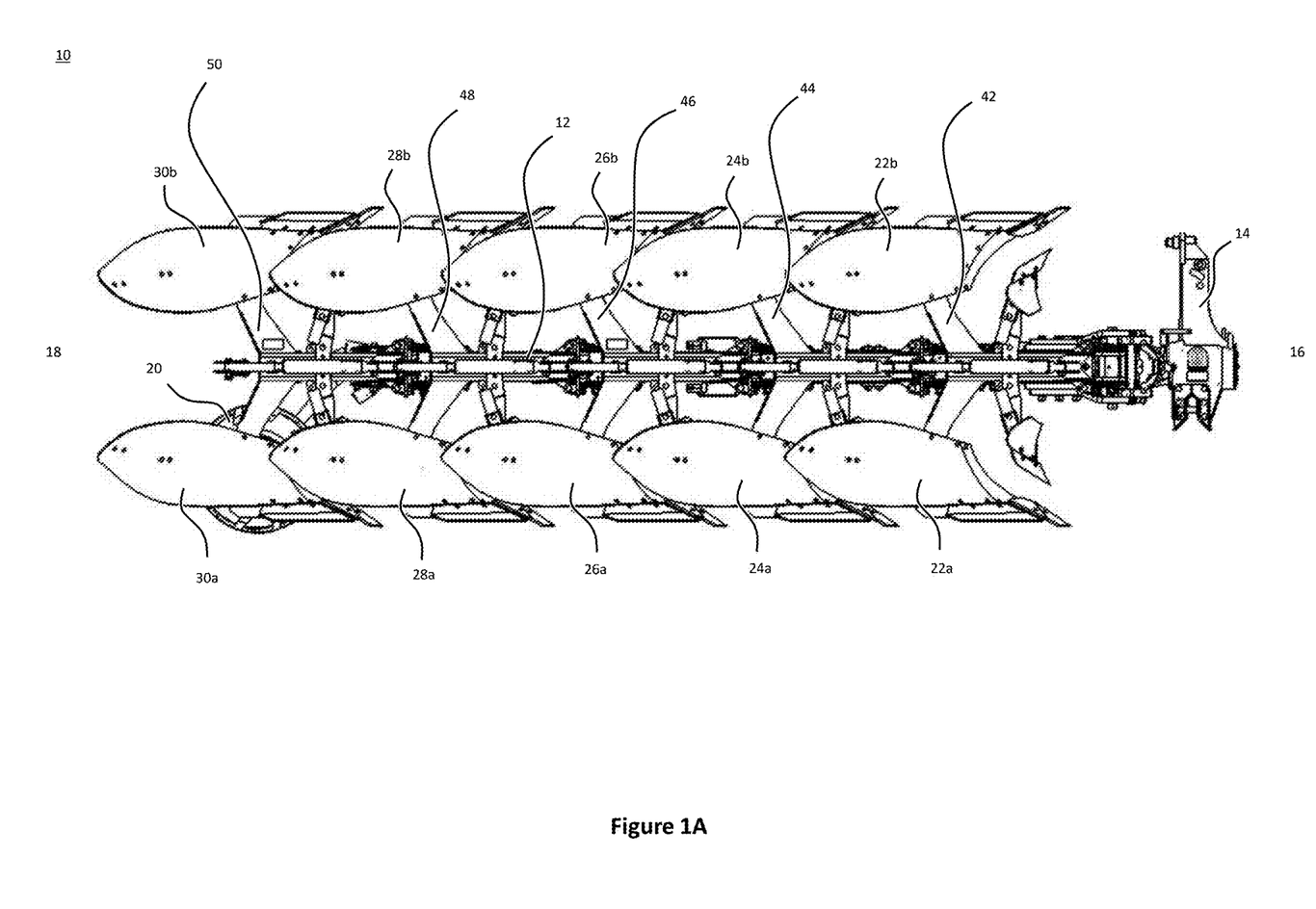
FIG. 1A shows a left-side view of an agricultural implement according to an embodiment of the present disclosure.
Figure 1B:
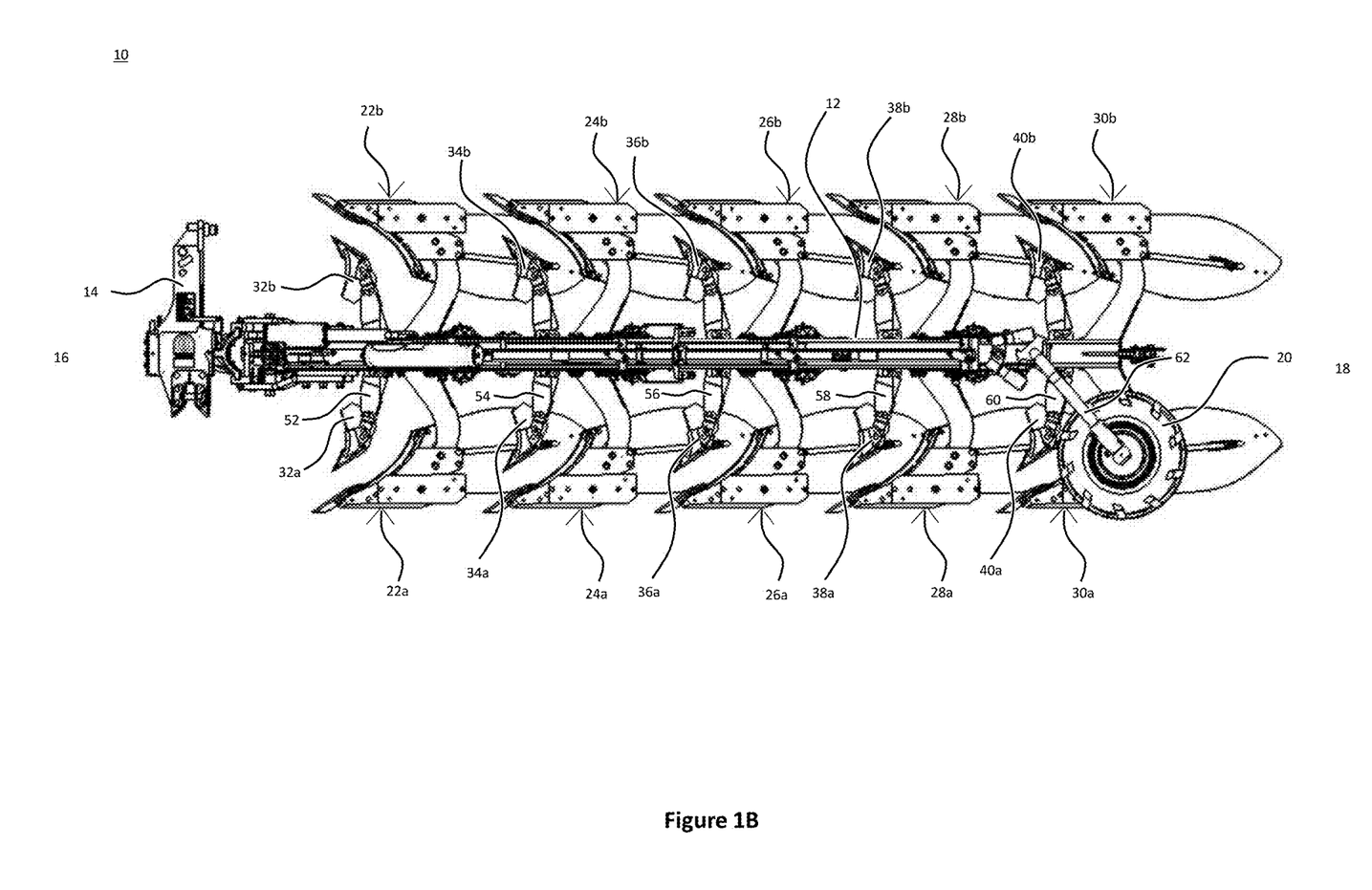
FIG. 1B shows a right-side view of the agricultural implement shown in FIG. 1A.
Figure 1C:
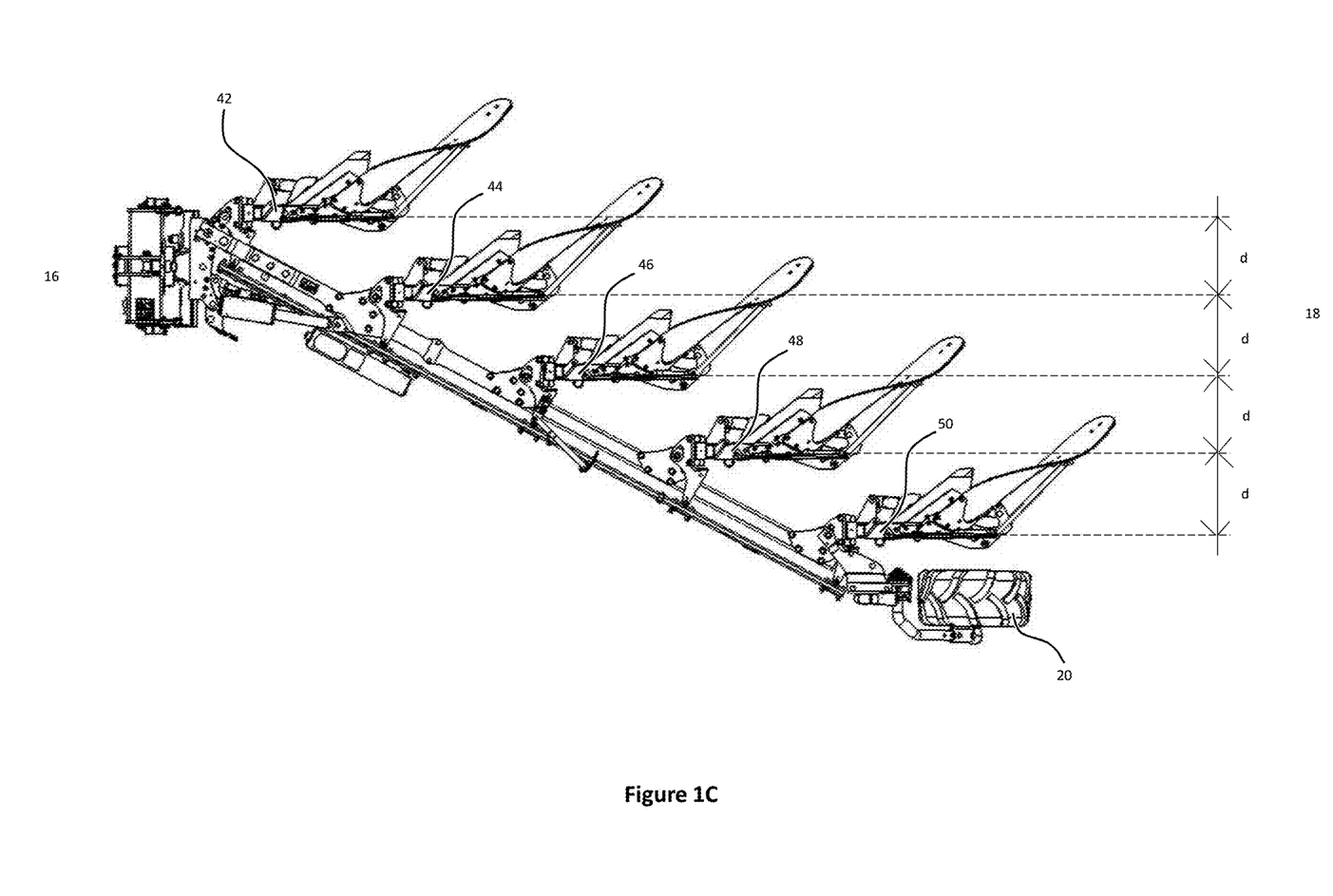
FIG. 1C shows a plan view of the embodiment shown in FIG. 1C.

FIGS. 1A to 1C show various views of an agricultural implement, particularly a plough 10. As will be described in more detail below, the plough 10 shown in FIGS. 1A to 1C is a reversible plough.

The plough 10 comprises a main frame 12. The main frame 12 may be a rectangular tube extending between a headstock 14 at a front end 16 of the plough towards a plough wheel 20 at a rear end 18 of the plough. The main frame 12 supports a variety of ground-engaging tools. In the example of FIGS. 1A to 1C, the ground engaging tools include plough bodies 22a, 22b, 24a, 24b, 26a, 26b, 28a, 28b, 30a, 30b and plough skimmers 32a, 32b, 34a, 34b, 36a, 36b, 38a, 38b, 40a, 40b. Each of the plough bodies 22a, 22b, 24a, 24b, 26a, 26b, 28a, 28b, 30a, 30b are connected to the main frame 12 by means of beams 42, 44, 46, 48, 50. Each of the beams 42, 44, 46, 48, 50 has a substantially Y-shaped structure.

A first beam 42 supports a first pair of plough bodies 22a, 22b. A second beam 44 supports a second pair of plough bodies 24a, 24b. A third beam 46 supports a third pair of plough bodies 26a, 26b. A fourth beam 48 supports a fourth pair of plough bodies 28a, 28b. A fifth beam 50 supports a fifth pair of plough bodies 30a, 30b.

Each of the pairs of plough bodies 22a, 22b, 24a, 24b, 26a, 26b, 28a, 28b, 30a, 30b is designed to create a furrow in the field when the plough is dragged behind or pushed by an agricultural vehicle such as a tractor. It follows that each run of the illustrated plough 10 through a field creates five adjacent furrows.

Figure 4:
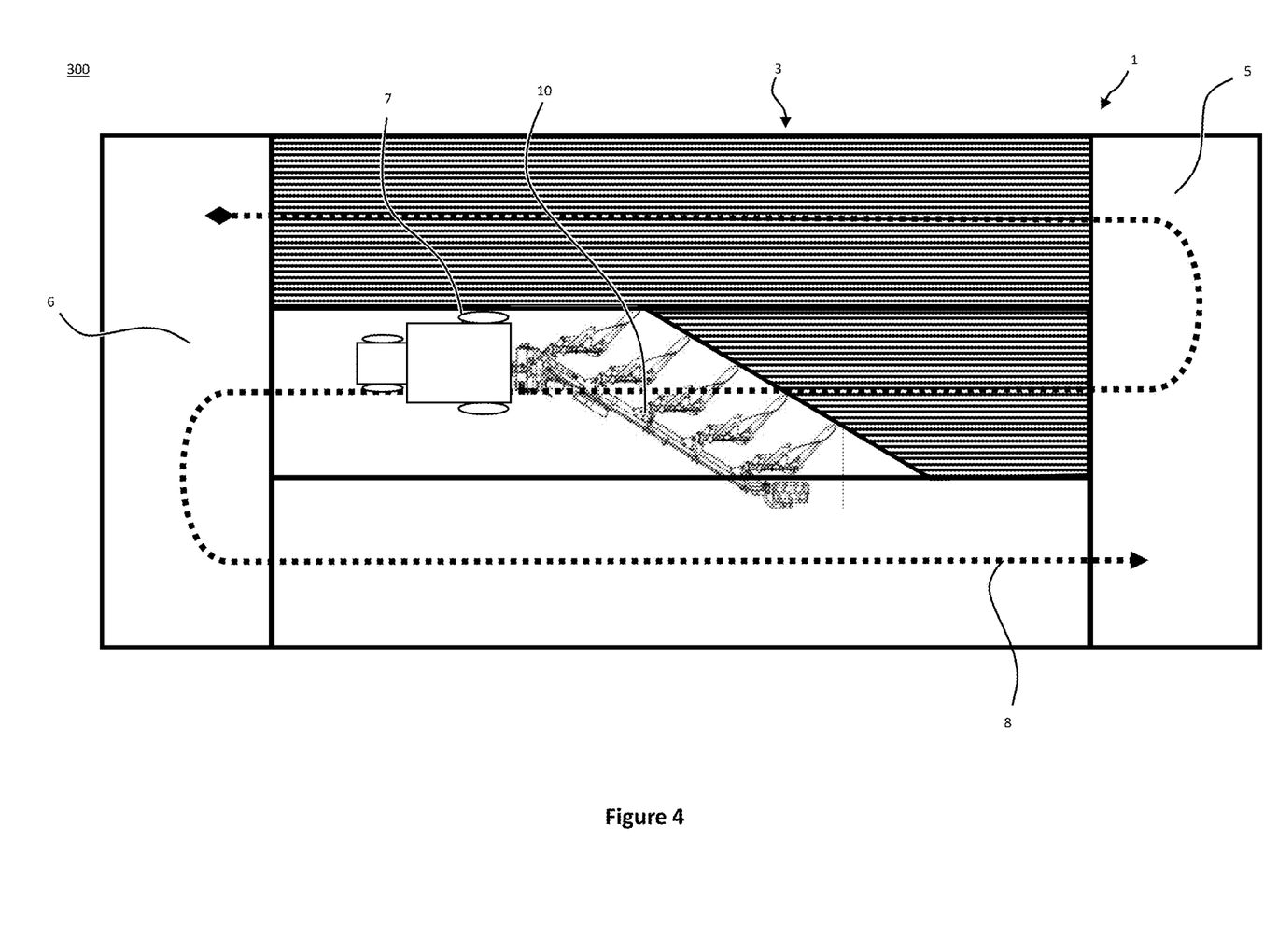
FIG. 4 shows a schematic trajectory of an agricultural machinery on the work area.

A first mounting rail 52 supports a first pair of skimmers 32a, 32b. A second mounting rail 54 supports a second pair of skimmers 34a, 34b. A third mounting rail 56 supports a third pair of skimmers 36a, 36b. A fourth mounting rail 58 supports a fourth pair of skimmers 38a, 38b. A fifth mounting rail 60 supports a fifth pair of skimmers 40a, 40b. The skimmers 32a, 32b, 34a, 34b, 36a, 36b, 38a, 38b, 40a, 40b and/or their respective mounting rails 52, 54, 56, 58, 60 may be adjustable with respect to the main frame 12 to change the distance between the skimmers 32a, 32b, 34a, 34b, 36a, 36b, 38a, 38b, 40a, 40b and the main frame 12. In one example, the skimmers 32a, 32b, 34a, 34b, 36a, 36b, 38a, 38b, 40a, 40b may be movable up and down towards and away from the main frame 12 to individually adjust the working depth of each of skimmers 32a, 32b, 34a, 34b, 36a, 36b, 38a, 38b, 40a, 40b. The skimmers 32a, 32b, 34a, 34b, 36a, 36b, 38a, 38b, 40a, 40b may either be manually or automatically adjustable. Turning to FIG. 4, a typical operation of an agricultural machinery comprising a tractor 7 and a plough 10 is described. In use, the plough 10 is drawn as an attachment (implement) behind an agricultural towing vehicle (e.g. tractor 7). It will be appreciated that it is equivalently feasible to locate the plough 10 in front of or both in front of and behind the tractor 7.

FIG. 4 shows a schematic work area 1, e.g. a crop field, which is divided into a main field 3 and headlands 5,6. A tractor 7 draws the plough 10 across the main field 3 in generally parallel working rows. The working rows are part of the trajectory 8 of the tractor 7 and typically run in parallel with a long edge of the work area 1. Each working row represents an individual run of the agricultural machinery across the field between headlands 5 and 6. As will be described in more detail below, a five-furrow plough, such as the exemplary plough shown in FIGS. 1A to 1C creates a total of five furrows per run.

At the end of each run/working row, the tractor 7 and plough 10 use the upcoming headland 5 or 6 for turning around, as indicated by trajectory 8. It is known in the art that the soil of the headlands 5, 6 is subject to greater levels of soil compaction as it receives more traffic per unit area than the main field 3. In order not to disturb the soil of the headlands 5, 6 more than necessary, it is known to lift the ground engaging tools, such as the plough bodies and the skimmers, off the ground into a headland or transfer position, just before the plough 10 reaches the headlands 5 or 6 respectively. Once the tractor 7 and the corresponding plough 10 have turned on the headland 5, 6, the ground engaging tools of the plough 10 are, again, lowered towards an operating position to engage the soil of the main field 3.

In the illustration of FIG. 4, the plough 10 is working on the main field 3 and, therefore, is arranged in the operating position. As the plough 10 reaches the border between the headland 5/6 and the main field 3, the plough 10 is transferred to a headland/transfer position. It follows that each working row starts with an adjustment of the plough from the transfer position into the operating position and ends with an adjustment of the plough from the operating position into the transfer position.

The plough 10 shown in FIGS. 1A to 1C is of the fully-mounted type. In fully-mounted ploughs, the weight of the plough is carried exclusively by the tractor when the plough is in its transfer position (on the headlands). In other words, the plough is then exclusively supported by the tractor 7 via headstock 14 and may be lifted off the ground with a lift cylinder of a tractor linkage.

During the turning movement on the headlands, the plough 10 is also reversed. That is, the main frame 12 is rotated by 180 degrees with respect to the headstock 14 to move the plough from a first configuration to a second configuration. In its first configuration shown in FIGS. 1A to 1C, the plough 10 is set up such that plough bodies 22a, 24a, 26a, 28a, and 30a of each of the pairs are in contact with the soil. This first configuration is shown in FIG. 4 and sometimes also referred to as the "left side configuration", since most of the plough bodies are arranged to the left of tractor 7. In its second configuration (not illustrated), the plough 10 is set up such that plough bodies 22b, 24b, 26b, 28b, and 30b of each of the pairs are in contact with the soil. This second configuration is achieved after rotating the main frame by 180 degrees, such that the majority of plough bodies are then located to the right of the tractor (not shown). The second configuration is, therefore, also sometimes referred to as the "right side configuration".

Tilling the field with the plough 10 in this first configuration provides a first furrow created by the first plough body 22a, a second furrow created by the second plough body 24a, a third furrow created by the third plough body 26a, a fourth furrow created by the fourth plough body 28a, and a fifth furrow created by the fifth plough body 30a. A furrow width is determined by the lateral distance d between the plough bodies 22a, 22b, 24a, 24b, 26a, 26b, 28a, 28b, 30a, 30b, as illustrated in FIG. 1C.

As the reversible plough 10 reaches the end of the first run, the main frame 12 is rotated by 180 degrees (reversed) with respect to the headstock 14. A turning cylinder (not shown), attached to the headstock 14 is may be used to rotate (reverse) the plough 10. During rotation of the main frame, the first set of plough bodies, e.g. 22a, 24a, 26a, 28a, 30a, are transferred to the top of the plough 10. At the same time, the second set of plough bodies e.g. 22b, 24b, 26b, 28b, 30b, that were not in use in the previous run is then transferred to the lower end of the plough 10 and will be submerged in the soil during the next run. The reversible plough is then in its second configuration (not shown).

Executing a second run of the field with the plough 10 in this second configuration provides a first furrow created by the sixth plough body 22b, a second furrow created by the seventh plough body 24b, a third furrow created by the eighth plough body 26b, a fourth furrow created by the ninth plough body 28b, and a fifth furrow created by the tenth plough body 30b.

Reversing the plough 10 between consecutive runs has the advantage that the plough bodies 22a, 22b, 24a, 24b, 26a, 26b, 28a, 28b, 30a, 30b that engage the soil always face the same side edge of the main field 3, irrespective of the tractor's orientation.

In both configurations of the plough, adjustment of the working depth of the skimmers 32a, 32b, 34a, 34b, 36a, 36b, 38a, 38b, 40a, 40b and the plough bodies 22a, 22b, 24a, 24b, 26a, 26b, 28a, 28b, 30a, 30b is achieved via respective depth wheels. In FIGS. 1A to 1C, only a first depth wheel 20 is shown. In the first configuration, shown in FIGS. 1A to 1C, the working depth is adjusted by means of the first depth wheel 20. In the second configuration, shown in FIGS. 1A to 1C, the working depth is adjusted by means of the second depth wheel (not illustrated), that is arranged on an opposite side of the main frame 12 to the first depth wheel 20. As will be described in more detail with reference to FIGS. 3A and 3B below, both the first depth wheel (102) and the second depth wheel (106, FIG. 2A) are pivotable with respect to the main frame 12 in order to adjust the working depth of the skimmers 32a, 32b, 34a, 34b, 36a, 36b, 38a, 38b, 40a, 40b and the plough bodies 22a, 22b, 24a, 24b, 26a, 26b, 28a, 28b, 30a, 30b.

Figure 2A:
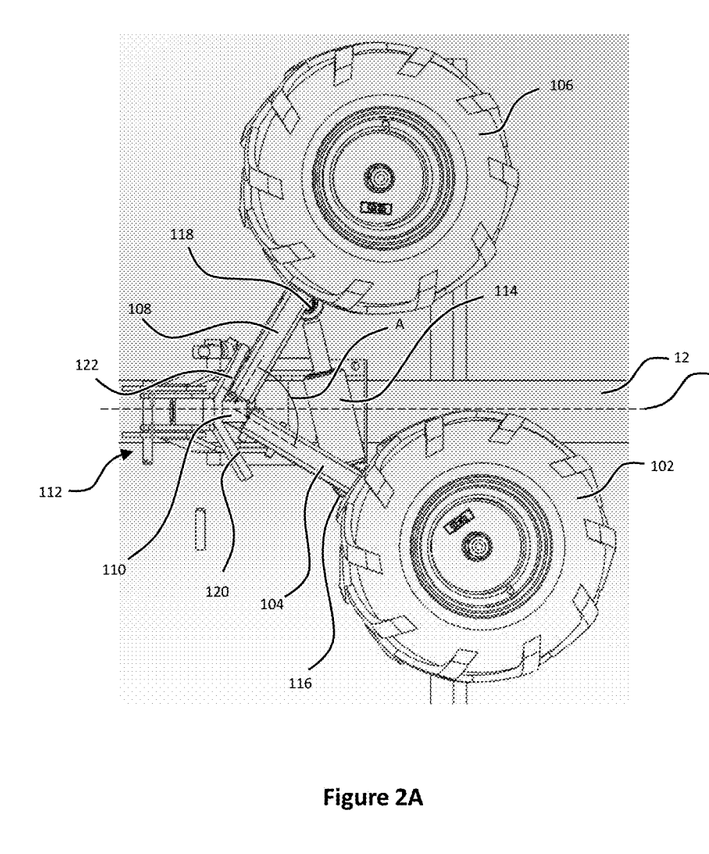
FIG. 2A shows a side view of a double-wheel arrangement of the present disclosure.
Figure 2B:
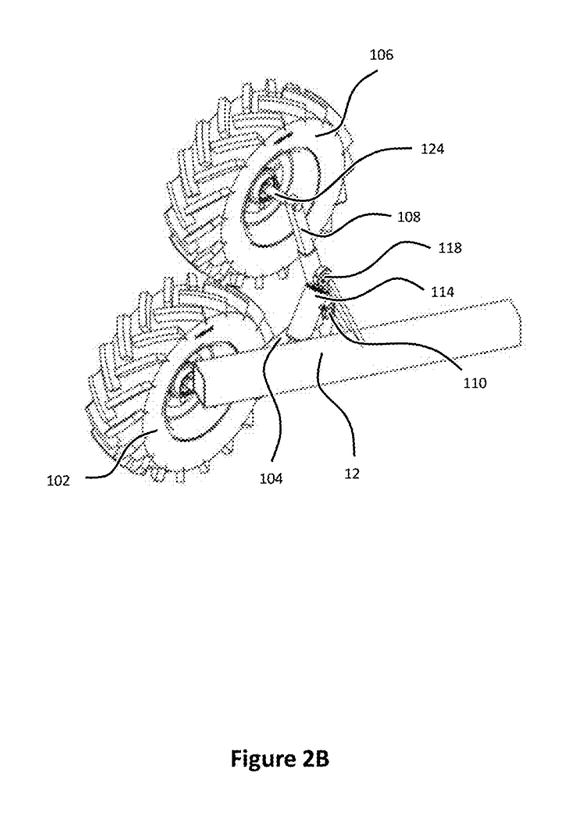
FIG. 2B shows a perspective view of the double wheel arrangement of FIG. 2A.

An enlarged view of the double wheel arrangement is shown in FIGS. 2A and 2B. The first depth wheel 102 is connected to a common pivot 110 via a first wheel arm 104. The second depth wheel 106 is connected to the common pivot 110 via a second wheel arm 108. Accordingly, the first depth wheel 102 and the second depth wheel 106 are pivotable about a common axis defined by common pivot 110. The common pivot 110 is connected to the main frame 12 via a mounting structure 112. The mounting structure 112 may either be removably connected to the main frame 12, such as shown in FIG. 2A, or be an integral part of the main frame itself. The common pivot 110 is centrally aligned with the main frame 12, such that the pivoting axis defined by the common pivot 110 intersects a longitudinal axis L that extends along the longitudinal direction of the main frame 12.

Any pivoting movement of the first depth wheel 102 or the second depth wheel 106 results in a movement of the respective depth wheel 102, 106 with respect to the main frame 12.

A hydraulic actuator 114 is arranged between the first depth wheel 102 and the second depth wheel 106. In the particular example of FIGS. 2A and 2B, the hydraulic cylinder 114 is arranged between the first wheel arm 104 and the second wheel arm 108. A first, piston-side end 116 of the hydraulic cylinder is attached to the first wheel arm 104. A second, rod-side end of the hydraulic cylinder 114 is attached to the second wheel arm 108. The hydraulic cylinder 114 may be used by the operator to adjust a wheel angle A between the first wheel arm 104 and the second wheel arm 108. As the hydraulic cylinder 114 is extended, the wheel angle A increases. If the hydraulic cylinder 114 is retracted, the wheel angle A decreases.

As will be described in more detail below, the first depth wheel 102 has a first and a second position, when the main frame 12 is in its first configuration. The first position is reached when the hydraulic actuator 114 is fully extended. In its first position, the first depth wheel 102 maximises the ground clearance of the main frame 12 and, therefore, minimises the working depth of the first plurality of ground engaging tools, such as plough bodies 22a, 24a, 26a, 28a, and 30a. The second position is reached when the hydraulic actuator 114 is fully retracted. In its second position, the first depth wheel minimises the ground clearance of the main frame 12 and, therefore, maximises the working depth of the first plurality of ground engaging tools, such as plough bodies 22a, 24a, 26a, 28a, and 30a.

Similarly, when the main frame 12 is in its second configuration, the second depth wheel 106 has a first and a second position. The first position is reached when the hydraulic actuator 114 is fully extended. In its first position, the second depth 106 wheel maximises the ground clearance of the main frame 12 and, therefore, minimises the working depth of the second plurality of ground engaging tools, such as plough bodies 22b, 24b, 26b, 28b, and 30b. The second position is reached when the hydraulic actuator 114 is fully retracted. In its second position, the second depth wheel 106 minimises the ground clearance of the main frame 12 and, therefore, maximises the working depth of the second plurality of ground engaging tools, such as plough bodies 22b, 24b, 26b, 28b, and 30b.

A first end stop 120 and a second end stop 122 are provided on the mounting structure 112. In the first configuration of the main frame 12, the second end stop 122 acts as an abutment for the second wheel arm 108 in a third position of the second depth wheel 106. As will be described in more detail below, the second depth wheel 106 is fixed in its third position (FIG. 2A), when the main frame 12 is in its first configuration.

In the second configuration of the main frame 12, the first end stop 120 acts as an abutment for the first wheel arm 104 in a third position of the first depth wheel 102. As will be described in more detail below, the first depth wheel 102 is fixed in its third position (not shown), when the main frame 12 is in its second configuration.

In the illustrations of FIGS. 2A and 2B, the main frame 12 is in its first configuration. The second wheel 106 is, therefore, in its third position. In this third position, a vertical distance between the second depth wheel 106 and the main frame 12 is maximised and the second depth wheel 106 is biased against the second end stop 122 by gravity. The first depth wheel 102 shown in FIG. 2A is located between its first and second position. In this illustration, the hydraulic cylinder 114 is partially extended. The first wheel arm 104 will abut against the first end stop 120, when the first depth wheel 102 is in its first end position. In this embodiment, this is achieved by fully extending hydraulic cylinder 114 such that the first wheel arm 104 pivots towards the first end stop 120 (see FIG. 3A). In other words, in this embodiment, the first end stop 120 limits a maximum extension of the hydraulic cylinder 114 and, at the same time, a maximum main frame clearance. The second position of the first depth wheel is achieved if the hydraulic cylinder 114 is completely retracted. The second position is shown in more detail in FIG. 3B, for example.

It should be understood that, in other embodiments, the first wheel arm 104 may not abut against the first end stop 120, when the first depth wheel 102 is in its first position. Rather, the first end position could be determined by a maximum extent of the hydraulic cylinder 114. For example, suppose that in FIG. 2A, the hydraulic cylinder 114 was shown in its fully extended state. Then, FIG. 2A would also illustrate the first wheel 102 in its first position, i.e. not resting against the first end stop 120. In this example, both the first end stop 120 and the second end stop 122 only act as an abutment for the inactive depth wheel in their respective third position. In particular, in the first configuration of the main frame 12 (shown in FIG. 2A), the second end stop 122 will act as a stop for the inactive second depth wheel 106 in its third position. In the second position of the main frame 12 (not shown), the first end stop 120 will then act as a stop for the then inactive first depth wheel 102 in its third position. The first end stop 120 will be inactive in the first configuration of the main frame 12. Similarly, the second end stop 122 will be inactive in the second configuration of the main frame 12.

The design of the second wheel arm 108 is illustrated in FIG. 2B. As mentioned above, the second wheel arm 108 connects the second depth wheel 106 to the main frame 12. In more detail, the second wheel arm of this embodiment, connects a central axis 124 of the second depth wheel 106 with common pivot 110. The illustrated second wheel arm 108 is adjustable in length. In particular, the second wheel arm 108 is constructed as a telescopic arm and enables the operator to adjust the distance between the common pivot 110 and the central axis 124 of the second depth wheel 106. Although this is not shown in detail in FIG. 2B, the first wheel arm 104 may also be constructed as a length adjustable telescopic arm.

Figure 3A:
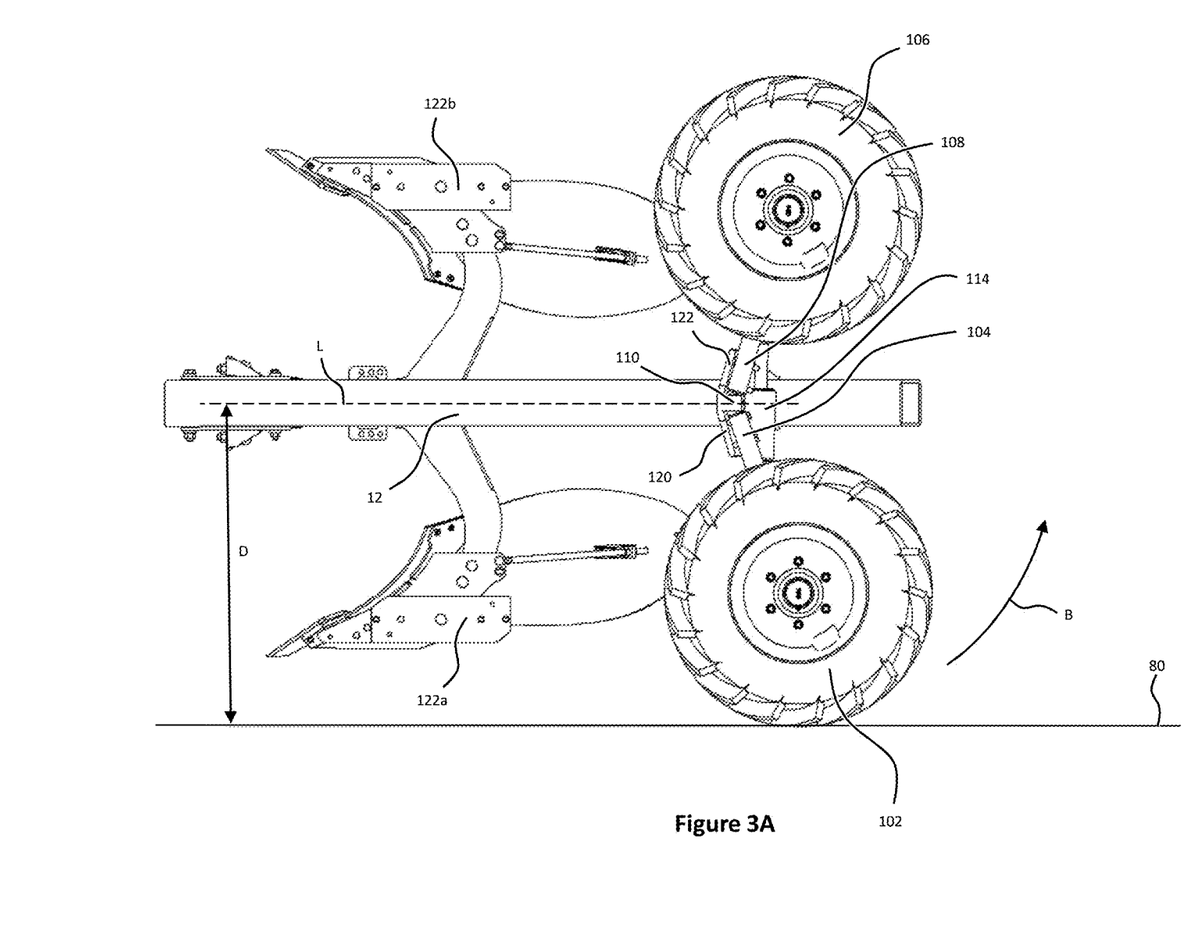
FIG. 3A shows a schematic representation of a section of an agricultural implement, when both depth wheels are in their first position.
Figure 3B:
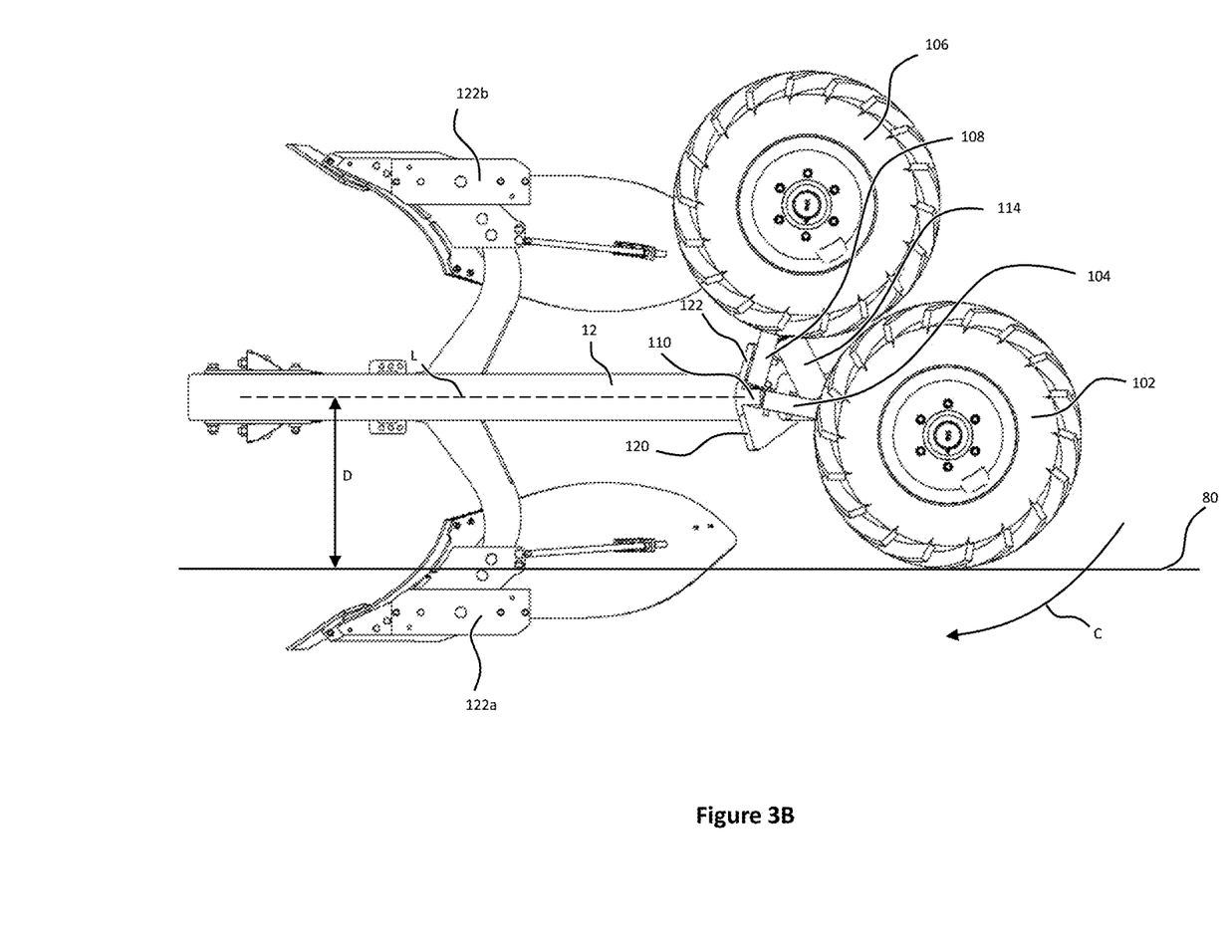
FIG. 3B shows a schematic representation of a section of an agricultural implement, when the first depth wheel is in its second position and the second depth wheel is in its first position.

FIGS. 3A and 3B schematically show the first and second positions of the first depth wheel 102. In both illustrations, the second depth wheel 106 is biased into its third position. FIG. 3A shows a scenario, in which the first depth wheel 102 is in its first position. In the first position of the first depth wheel 102, a ground clearance D of the main frame 12 is maximised. The agricultural implement may be set up such that, when the first depth wheel 102 is in its first position, the first plurality of ground engaging tools, e.g. a plough body 122a, remains above the ground surface 80.

It will be understood that, in this embodiment, when the first end wheel 102 is in its first position and the second depth wheel 106 is in its third position, the hydraulic cylinder 114 is fully extended, thereby bringing both wheel arms 104, 108 into contact with their respective end stop 120, 122. In this position of the agricultural implement 10, i.e. when the main frame 12 is in its first configuration, a large share of the weight of the agricultural implement is supported by the first depth wheel 102. The reactive force created by the first depth wheel 102 tries to pivot the first depth wheel 102 about common pivot 110. The force trying to pivot the first depth wheel 102 is transferred to the second depth wheel, more particularly to the second arm 108 of the second depth wheel 106, via hydraulic cylinder 114. However, since the second depth wheel 106 is in its third configuration, in which the second wheel arm 108 rests against the second end stop 122, neither the second depth wheel 106 nor the first depth wheel 102 may rotate about common pivot 110. In the configuration of the main frame 12 shown in FIG. 3A, a pivoting movement of the first depth wheel 102 is only possible if the hydraulic cylinder 114 is retracted. In other words, for as long as the hydraulic cylinder 114 remains fully extended, neither the first depth wheel 102 nor the second depth wheel 106 may pivot about common pivot 110, as the pivoting movement is prevented by the second end stop 122. It should again be noted that, in other embodiments, only the inactive depth wheel is in contact with its end stop (in its third position) when the active depth wheel is its first position.

As the hydraulic cylinder 114 connecting the first and second depth wheels 102, 106 is retracted, the wheel angle A reduces and allows for a pivoting movement of the first wheel 102 about pivot 110, as indicated by arrow B in FIG. 3A. Since, the weight of the frame is still transferred to the second wheel arm 108 via hydraulic cylinder 114, the second wheel 106 remains in its third position with the second wheel arm 108 biased towards the second end stop 122.

Turning to FIG. 3B, there is shown a situation in which the first depth wheel 102 has reached its second position, i.e. when the hydraulic cylinder 114 has fully retracted. A pivoting movement of the first depth wheel 102 from its first position (FIG. 3A) to its second position (FIG. 3B) causes the main frame 12 of the agricultural implement 10 to move closer to ground surface 80. It follows that the ground clearance D of the main frame 12 reduces to a minimum when the first depth wheel 102 is in its second position. In this second position of the first depth wheel 102, the working depth of the first plurality of ground engaging tools, i.e. plough body 122a, is maximised.

The first and second depth wheels 102, 106 are generally free to pivot about common pivot 110 between end stops 120 and 122. However, for as long as the first depth wheel 102 is in contact with ground surface 80 and carries the weight of the agricultural implement 10, the second depth wheel 106 will be biased towards its third position, as shown in FIGS. 3A and 3B. Accordingly, for as long as the agricultural implement is in its first configuration, the second depth wheel 106 will remain in its third position, whereas the first depth wheel 102 may be pivoted between its first position and its second position by means of hydraulic cylinder 114. For example, if the working depth of the first plurality of ground engaging tools, such as plough body 122a, is to be decreased (i.e. plough body 122a is lifted up) an extension of hydraulic cylinder 114 will pivot the first depth wheel 102 in the direction of arrow C and increase the ground clearance D of the main frame. In other words, extension of the hydraulic cylinder 114, in the first configuration of the agricultural implement 10, causes the first wheel arm 104, together with the first depth wheel 102, to pivot in the direction of first end stop 120. By contrast, retracting the hydraulic cylinder 114 causes the first wheel 102 to pivot towards its second position, i.e. in direction B shown in FIG. 3A.

As the agricultural implement is working on the main field 3 (FIG. 4), the first plurality of ground engaging tools are in contact with the soil and the first depth wheel 102 is either in its second position or between the first and second positions. As the agricultural implement approaches one of the headlands 5, 6, hydraulic cylinder 114 is fully extended so as to transfer the first depth wheel 102 into its first position shown in FIG. 3A. As a consequence of moving the first depth wheel 102 into its first position, the first plurality of ground engaging tools are lifted out of the ground. At this point, the operator may also lift the entire agricultural implement 10 off the ground and reverse the main frame 12 into its second configuration.

Once the main frame has been transferred from its first (left side) configuration towards its second (right side) configuration, the agricultural implement 10 is lowered until the second depth wheel 106 engages with the ground surface 80. At this point (not shown), the first depth wheel 102 will be biased towards its third position, in which the first wheel arm 104 abuts against the first end stop 120, and the second depth wheel 106 will be in its first position with the hydraulic cylinder 114 being fully extended. It follows that the second plurality of ground engaging tools, such as plough body 122b, are not yet in contact with the soil. As the agricultural implement 10 leaves the headland 5, 6 and approaches the main field 3, the hydraulic cylinder 114 is continuously retracted such that the second depth wheel 106 is pivoted from its first position towards its second position gradually. Consequently, the second plurality of ground engaging tools is gradually inserted into the soil until a desired working depth is reached when the second depth wheel 106 is in a desired position (between its first and second positions or in the second position) and the hydraulic cylinder 114 appropriately retracted. Generally, it will be understood that, in the second configuration of the main frame, the functionality of the double wheel arrangement is reversed. That is, the second depth wheel 106 now runs on the soil with the second depth wheel 106 being pivotable about common pivot 110 by actuation of hydraulic cylinder 114, whereas the first wheel 102 remains biased into its third position by the weight of the main frame 12. It will be appreciated that, in the embodiment of FIGS. 3A and 3B, the first and second wheel arms 104, 108 rest against their respective end stops 120, 122, in both their first and third positions.

The first position of the first and second depth wheel 102, 106 is generally determined by the maximum extend of the hydraulic cylinder 114. In the example of FIG. 3A, the maximum extend of hydraulic cylinder 114 is limited by the first and second end stops 120, 122 respectively. The second positions of the first and second depth wheels 102, 106 are determined by the minimum wheel angle between the first and second wheel arms 104, 108, i.e. full retraction of the hydraulic cylinder 114. Accordingly, in the agricultural implement of the present disclosure, a maximum working depth of the plough bodies may simply be adjusted by determination of the minimum wheel angle between the first and second wheels 102, 106. In the example of FIGS. 3A and 3B, this may be achieved by changing the size and/or position of the hydraulic cylinder 114.

Figure 5:
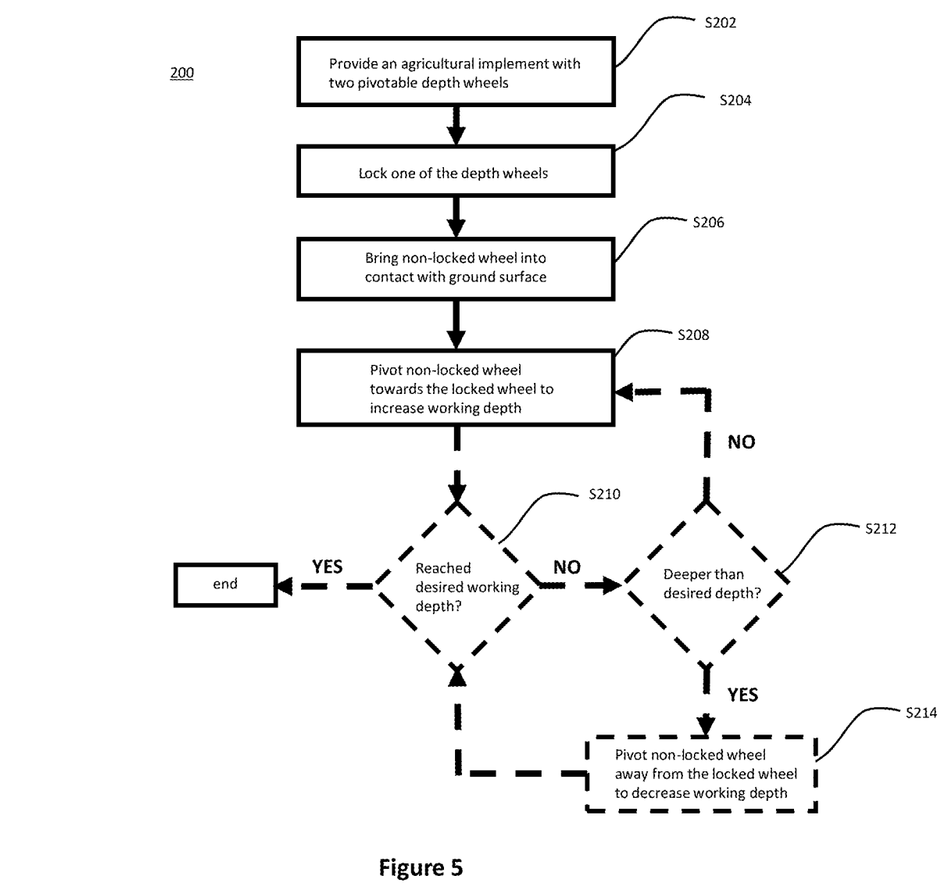
FIG. 5 shows a flow-chart of a method for adjusting the working depth of an agricultural implement according to an embodiment of the present disclosure.

Turning to FIG. 5, there is shown a flow diagram of a method for adjusting the working depth of an agricultural implement. In a first step S202, an agricultural implement with two pivotable depth wheels is provided. In one embodiment, the two depth wheels may be constructed per the double wheel arrangement described above with reference to FIGS. 2A, 2B, 3A, and 3B. In a second step S204, one of the two pivotable depth wheels is locked or immobilised. For example, one of the two depth wheels 102, 106 may be locked in or biased into their third position.

In a third step S206, the non-locked depth wheel is brought into contact with the ground surface. It should be understood that steps S204 and S206 are interchangeable. In other words, it is also feasible to bring one of the depth wheels into contact with the soil before locking the other depth wheel in place. Indeed, in some examples bringing the lower of the depth wheels into contact with the ground can cause the upper depth wheel to be locked into its third position.

Once one of the two depth wheels is locked (locked wheel) and the other depth wheel (ground wheel) is in contact with the ground surface, the ground wheel may be pivoted towards or away from the locked wheel to adjust the working depth.

In the exemplary flow diagram of FIG. 5, the working depth is increased after step S206, in a step S208 by pivoting the non-locked/ground wheel towards the locked depth wheel.

In one embodiment (not illustrated), the non-locked depth wheel (ground wheel) may be pivoted towards the locked depth wheel as far as possible, i.e. until the second position is reached, in which the maximum working depth is achieved.

The depth adjustment method may simply end there.

In the embodiment of FIG. 5, an additional optional control loop (dashed lines) follows step S208. In particular, in a step S210 a sensor may verify whether a desired working depth has been reached. If so, the adjustment process is completed, and the method ends. If not, the actual depth measurement is compared to a desired working depth in step S212. If the measured working depth is deeper than the desired depth, a step S214 follows in which the working depth is reduced by pivoting the non-locked wheel (ground wheel) away from the locked wheel. Another verification step S210 may follow after step S214. If in step S212 the measured working depth is shallower than the desired depth, the method is looped back to steps S208 and S210 for further increase and re-evaluation of the working depth.

Figure 6:
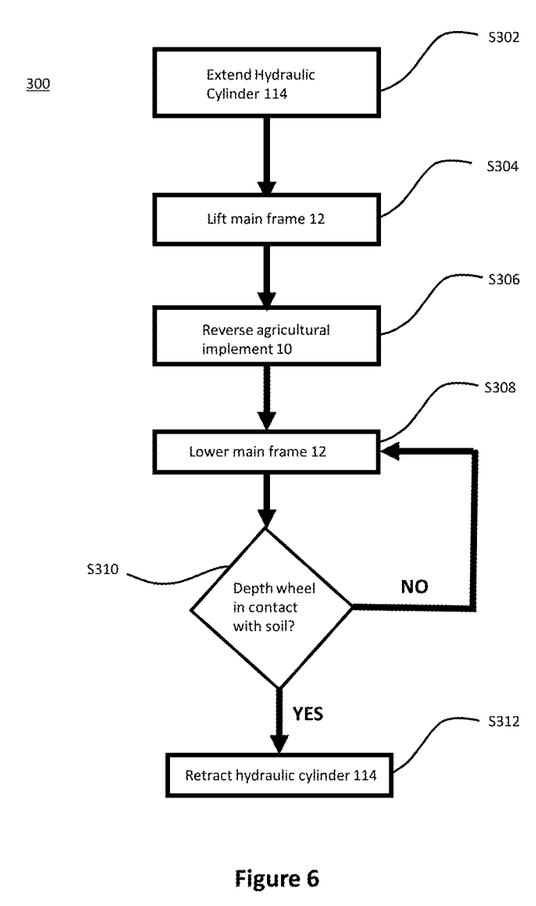
FIG. 6 shows a flow-chart of a method for controlling the reversal process of the agricultural implement of the present disclosure.

FIG. 6 shows a flow diagram of a method 300 for switching the configuration of the plough 10. In a first step S302, before the main frame 12 is lifted off the ground surface 80, the hydraulic cylinder 114 is fully extended, such that both wheel arms 104, 108 are biased against their respective end stops 120, 122. Next, in step S304 the main frame 12 is lifted off the ground, followed by another step S306 for reversing the main frame. In both steps S304 and S306, the hydraulic cylinder 114 remains fully extended, such that the wheel arms 104, 108 remain biased against their respective end stops 120, 122 and neither of the two depth wheels 102, 106 may pivot about common pivot 110. Rather, the double-wheel arrangement acts as a rigid structure during rotation of the main frame 12 in step S306. This has the advantage that neither of the two depth wheels 102, 106 flip or fall during the reversal movement, thereby avoiding inadvertent impacts that could reduce the service life of the agricultural implement. In an optional step S308, the main frame is lowered, while both wheel arms 104, 108 remain biased against their respective end stops 120, 122. Only when the first or second depth wheel 102, 106 (depending on the configuration of the main frame) once again comes into contact with the soil, is the hydraulic cylinder 114 retracted (step S312) to allow pivotal movement of the lower, ground engaging depth wheel with respect to the temporarily unused, upper, depth wheel. A step S310 may optionally be provided to verify that one of the two depth wheels 102, 106 is in contact with the soil before the method proceeds to step S312.

In an alternative embodiment, step S310 is not required and the hydraulic cylinder is retracted directly after the agricultural implement is reversed in step 308. Only then will the main frame 12 be lowered in a last step. This shorter embodiment does not require sensors for verifying soil contact of the depth wheel and can thus be accomplished with mechanical parts, such as a hydraulic sequence valve and a hydraulic memory cylinder.

The present disclosure is not restricted to agricultural ploughs but may be used with any other agricultural implement that benefits from a double-wheel arrangement. In other embodiments, the depth wheels 102, 106 may be replaced by continuous tracks as applied, for example, on particularly soft and slippery soils. The hydraulic actuator 114 is one of many examples for an actuator controlling the wheel angle between the first and second wheel arms. Any other suitable actuator could of course be provided instead of the hydraulic actuator 114.

Figure 7:
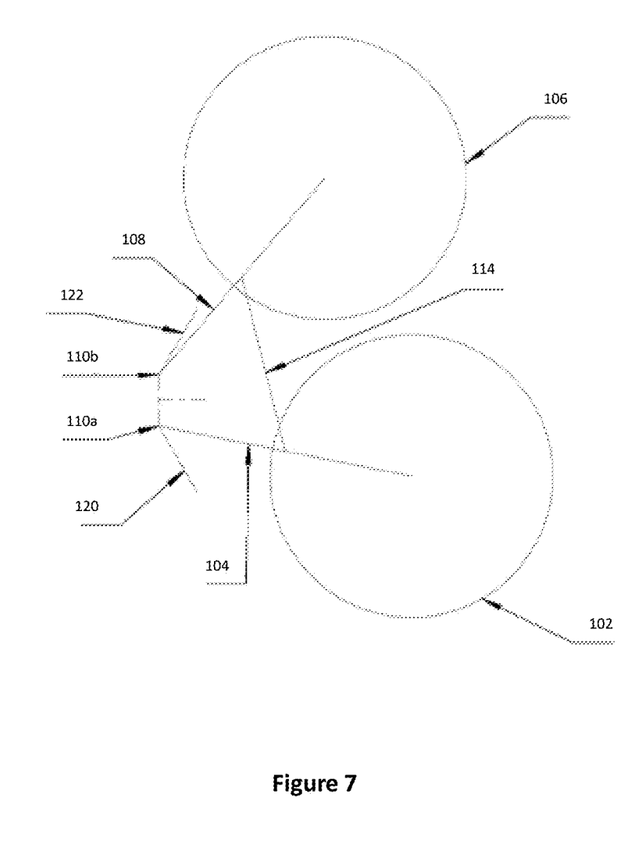
FIG. 7 shows a schematic side view of a double-wheel arrangement of the present disclosure.

Turning to FIG. 7, there is shown a schematic representation of a double wheel arrangement of another embodiment of the present disclosure. The double wheel arrangement is similar to the double wheel arrangement shown in FIG. 2A and parts with the same functionality have been labelled with identical reference signs.

The double wheel arrangement of FIG. 7 comprises a first depth wheel 102 connected to a first pivot 110a via a first wheel arm 104. A second depth wheel 106 is connected to a second pivot 110b via a second wheel arm 108. The first pivot 110a is distanced from the second pivot 110b. The first and second pivots 110a, 110b are connected to the main frame 12, such that both the first and the second depth wheels 102, 106 are pivotable with respect to the main frame 12.

A hydraulic cylinder 114 connects the first and second wheel arms 104, 108.

The embodiment of FIG. 7 differs from the embodiment shown in FIG. 2A in that the first and the second wheel arms 104, 108 are connected to separate pivots 110a, 110b. In FIG. 2A, both wheel arms are connected to a common pivot 110.

The listing or discussion of an apparently prior-published document in this specification should not necessarily be taken as an acknowledgement that the document is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the disclosure.

The invention claimed is:

1. An agricultural implement comprising:
a main frame supporting a plurality of ground engaging tools, the main frame being transferable between a first configuration, in which a first plurality of ground engaging tools are in a working position, and a second configuration, in which a second plurality of ground engaging tools are in a working position;
a first depth wheel connected to the main frame such that the position of the first depth wheel with respect to the main frame defines a working depth of the first plurality of ground engaging tools, when the main frame is in its first configuration; and
a second depth wheel connected to the main frame such that the position of the second depth wheel with respect to the main frame defines a working depth of the second plurality of ground engaging tools, when the main frame is in its second configuration,
wherein at least the first depth wheel is pivotable in such a way that the first depth wheel moves with respect to the main frame and the second depth wheel;
wherein the first and second depth wheel are both pivotable;
wherein the first and second depth wheel are connected to the main frame via a common pivot or separate pivots;
wherein the first depth wheel is connected to the common pivot via a first wheel arm and the second depth wheel is connected to the common pivot via a second wheel arm, the first and the second wheel arm defining a wheel angle (A) between each other, the wheel angle (A) being adjustable.

2. The agricultural implement of claim 1, wherein the at least first depth wheel is pivotable during a working operation of the agricultural implement, in order to adjust the working depth of the first plurality of ground engaging tools.

3. The agricultural implement of claim 1, wherein the agricultural implement comprises an actuator capable of adjusting the wheel angle (A).

4. The agricultural implement of claim 1, wherein the first and the second wheel arms are pivotable with respect to the main frame such that the working depth of the first plurality of ground engaging tools, in the first configuration of the main frame, is adjustable by changing the wheel angle (A).

5. The agricultural implement of claim 1, wherein the first and the second wheel arms are pivotable with respect to the main frame such that the working depth of the second plurality of ground engaging tools, in the second configuration of the main frame, is adjustable by changing the wheel angle (A).

6. The agricultural implement of claim 1, wherein the first wheel arm is configured such that a distance between a central axis of the first depth and the common pivot is adjustable, and wherein the second wheel arm is configured such that a distance between a central axis of the second depth wheel and the common pivot is adjustable.

7. The agricultural implement of claim 1, wherein, in the first configuration of the main frame, the first depth wheel is pivotable between a first position, in which a minimum working depth of the first plurality of ground engaging tools is set, and a second position, in which a maximum working depth of the first plurality of ground engaging tools is set, and wherein, in the second configuration of the main frame, the first depth wheel is in a third position.

8. The agricultural implement of claim 7, wherein the agricultural implement comprises a first end stop arranged such that that the first depth wheel is biased towards its third position against the first end stop, when the main frame is in its second configuration, and wherein the agricultural implement comprises a second end stop arranged such that that the second depth wheel is biased towards its third position against the second end stop, when the main frame is in its first configuration.

9. The agricultural implement of claim 1, wherein, in the second configuration of the main frame, the second depth wheel is pivotable between a first position, in which a minimum working depth of the second plurality of ground engaging tools is set, and a second position, in which a maximum working depth of the second plurality of ground engaging tools is set, and wherein, in the first configuration of the main frame, the second depth wheel is in a third position.

10. The agricultural implement of claim 1, wherein the agricultural implement is a reversible plough.

11. An agricultural machinery comprising an agricultural vehicle and the agricultural implement of claim 1, wherein the agricultural implement is connected to the front or the rear of the agricultural vehicle.

12. A method for adjusting the working depth of an agricultural implement, wherein the agricultural implement comprises a main frame, a first pivotable depth wheel and a second pivotable depth wheel connected to the main frame via a common pivot, the method comprising the following steps:
   immobilising the second pivotable depth wheel to prevent pivotal movement of the second pivotable depth wheel;
   bringing the first pivotable depth wheel in contact with a ground surface; and
   pivoting the non-locked first pivotable depth wheel toward or away with respect to the second pivotable depth wheel to adjust the working depth of the agricultural implement.

13. The method of claim 12, wherein the step of pivoting the first pivotable depth wheel occurs during a working operation of the agricultural implement.

14. The method of claim 12, wherein pivoting of the first pivotable depth wheel with respect to the second pivotable depth wheel comprises:
   pivoting the first pivotable depth wheel towards the second pivotable depth wheel, if an increase in the working depth of the agricultural implement is required; and
   pivoting the first pivotable depth wheel away from the second pivotable depth wheel, if a decrease in the working depth of the agricultural implement is required.

15. An agricultural implement comprising:
   a main frame supporting a plurality of ground engaging tools, the main frame being transferable between a first configuration, in which a first plurality of ground engaging tools are in a working position, and a second configuration, in which a second plurality of ground engaging tools are in a working position;
   a first depth wheel connected to the main frame such that the position of the first depth wheel with respect to the main frame defines a working depth of the first plurality of ground engaging tools, when the main frame is in its first configuration; and
   a second depth wheel connected to the main frame such that the position of the second depth wheel with respect to the main frame defines a working depth of the second plurality of ground engaging tools, when the main frame is in its second configuration,
   wherein at least the first depth wheel is pivotable in such a way that the first depth wheel moves with respect to the main frame and the second depth wheel,
   wherein a distance between the first depth wheel and the second depth wheel changes as the first depth wheel pivots with respect to the second depth wheel.

* * * * *